(12) United States Patent
Lin et al.

(10) Patent No.: US 12,547,135 B2
(45) Date of Patent: Feb. 10, 2026

(54) OPTIMIZATION METHOD AND SYSTEM FOR TURBINES OF THERMAL POWER UNIT BASED ON SPARSE BIG DATA MINING

(71) Applicant: NANJING UNIVERSITY OF POSTS AND TELECOMMUNICATIONS, Jiangsu (CN)

(72) Inventors: Jinxing Lin, Jiangsu (CN); Mingjie Lu, Jiangsu (CN); Zhi Hu, Jiangsu (CN)

(73) Assignee: NANJING UNIVERSITY OF POSTS AND TELECOMMUNICATIONS (CN)

( * ) Notice: Subject to any disclaimer, the term of this patent is extended or adjusted under 35 U.S.C. 154(b) by 375 days.

(21) Appl. No.: 18/548,447

(22) PCT Filed: Sep. 7, 2021

(86) PCT No.: PCT/CN2021/116827
§ 371 (c)(1),
(2) Date: Aug. 30, 2023

(87) PCT Pub. No.: WO2022/193569
PCT Pub. Date: Sep. 22, 2022

(65) Prior Publication Data
US 2024/0134331 A1 Apr. 25, 2024
US 2024/0231295 A9 Jul. 11, 2024

(30) Foreign Application Priority Data
Mar. 15, 2021 (CN) .......................... 202110276819.0

(51) Int. Cl.
G05B 15/02 (2006.01)
G06F 16/2458 (2019.01)

(52) U.S. Cl.
CPC ......... *G05B 15/02* (2013.01); *G06F 16/2465* (2019.01)

(58) Field of Classification Search
None
See application file for complete search history.

(56) References Cited

U.S. PATENT DOCUMENTS

2016/0138480 A1* 5/2016 Davis, Jr. .................. F02C 9/28
60/734

* cited by examiner

*Primary Examiner* — George Chen

(57) ABSTRACT

An optimization method for turbines of a thermal power unit based on sparse big data mining in the technical field of turbine optimization. The optimization method comprises: acquiring historical operating data of a unit; selecting a set of controllable operating parameters highly correlated with the heat rate of turbines as optimized parameters; constructing a new sparse data-oriented pattern-growth association rule mining algorithm based on binary matrixes and the hyperlink technique; proposing a load balancing strategy based on matrix operation on an Apache Spark platform, and parallelly implementing the global calculation-balanced pattern-growth association rule mining algorithm; and discretizing the historical operating data by clustering, parallelly mining the discretized historical operating data to obtain an association rule, and performing de-discretization to obtain target values of the optimized parameters of the turbines under boundary conditions.

7 Claims, 3 Drawing Sheets

OPTIMIZATION METHOD AND SYSTEM FOR TURBINES OF THERMAL POWER UNIT BASED ON SPARSE BIG DATA MINING

FIELD

The invention belongs to the technical field of turbine optimization, and particularly relates to an optimization method and system for turbines of a thermal power unit based on sparse big data mining.

BACKGROUND

In recent years, with the constant promotion of energy conservation and emission reduction in China, energy conservation and consumption reduction have become an urgent task of thermal power plants. Turbines are an important part of thermal power units, and the operating efficiency of the turbines directly determines power supply of the thermal power plants. It is of great importance to study operation optimization of the turbines of the thermal power units, which not only can improve the power generation efficiency, but also can reduce power generation costs. Association rule mining, as a widely applied and highly practical method in the data mining field, can explore hidden associations and relations between data. Compared with a design value method, an optimal operation test method and a variable-condition thermodynamic calculation method, a unit operation optimization method based on association rule mining can obtain a strong association rule between main operating parameters of a unit and relevant performance indicators of the unit in a good performance condition from long-term operating data of the unit, without establishing a complex mechanism model, thus avoiding limitations of the operating condition and high time consumption and labor consumption, and having high practicability. In addition, with the constant improvement of the degree of automation and Informa ionization, DCS and SIS are widely deployed in power plants, and mass operating data is accumulated, which creates a favorable condition for, operation optimization of the unit based on association rule mining.

Most algorithms in the prior art run serially and are used for processing a small batch of turbine sample data. However, due to the fact that the thermal power unit has a large number of operating parameters, the system condition is variable and the data acquisition cycle is short, a small batch of operating sample data will not be able to reflect the actual characteristics of the turbines. The Apriori algorithm or FP-Growth algorithm used for mining the frequent pattern of sparse data in the prior art are high in time consumption and memory usage due to its bottlenecks; and it is difficult to analyze and process mass data through serial association rule mining algorithms due to the limitation of hardware resources of a computer.

SUMMARY

To overcome the drawbacks in the prior art, the invention provides an optimization method and system for turbines of a thermal power unit based on sparse big data mining, which can effectively overcome the defects of high time consumption and memory usage of traditional association rule mining algorithms when these algorithms are used for mining the association rule of sparse mass data, and can mine mass data under the condition of load balance.

To fulfill the above objective, the technical solution adopted by the invention is as follows: an optimization method for turbines of a thermal power unit comprises: acquiring historical operating data and performing data preprocessing, with an optimization, objective of decreasing the heat rate of turbines; selecting, from the historical operating data, a set of controllable unit operating parameters, the correlation of which with the heat rate of the turbines conforms to a set condition, as optimized parameters through canonical correlation analysis-based rough screening and Pearson correlation analysis-based fine screening; constructing a sparse data-oriented pattern-growth association rule mining algorithm; parallelly implementing the global calculation-balanced pattern-growth association rule mining algorithm on a big data analysis and processing framework Apache Spark according to a load balancing strategy based on matrix operation; and discretizing the historical operating data through a fuzzy C-means algorithm, mining the discretized historical operating data based on the parallelly implemented pattern-growth association rule mining algorithm to obtain an association rule, and performing de-discretization to obtain target values of the optimized parameters of the turbines under boundary conditions.

Further, the data preprocessing comprises eliminating abnormal data and redundant data in the historical operating data and performing steady-state detection on the historical operating data.

Further, a criterion of the steady-state detection is that, in a period of time, a unit is considered as being in a steady operating condition when fluctuations of operating state parameters of the turbines are within set ranges.

Further, constructing a sparse data-oriented pattern-growth association rule mining algorithm comprises S31: setting a minimum support threshold, and traversing a sparse transaction dataset which is denoted as D, recording frequencies of items, and generating a frequent item list which is denoted as F_List; S32, traversing F_List marking frequent items with numbers, generating, an item header table, which is denoted as H-Table and comprises item numbers, support counts and a link pointer; S33, screening out non-frequent items in D, converting D into a binary matrix which is denoted as PBM, and storing the binary matrix, wherein an element marked by "1" indicates that a frequent item, corresponding to the element, in F-List is included in a transaction, and an element marked by "0" indicates that a frequent item, corresponding to the element, in the F-List is not included in a transaction; S34, scanning PBM, adjusting the pointer in H-Table, linking the position of a first "1" in each row of PBM with the corresponding frequent item in H-Table, extracting rows where the first "1" is located at a same position from PBM to generate multiple sub PBMs, and converting a task of mining all frequent item sets into multiple sub tasks of mining local frequent item sets; and S35: aggregating all the local frequent item sets, and outputting, all the frequent item sets.

Further, each sub task comprises the following steps: S341: scanning PBM, calculating the sum of each column, and updating support counts of frequent items in a sub H-table corresponding to the sub PBM; S342, linking, by means of the pointer, columns, the sum of which is greater than the minimum support threshold, in the sub PBM with the corresponding frequent items in the sub H-table to form longer local frequent item sets; and S343, recursively performing S341 and S342 until the sum of each column in the sub PBM is less than the minimum support threshold.

Further, parallelly implementing the global calculation-balanced pattern-growth association rule mining algorithm on a big data analysis and processing framework Apache Spark according to a load balancing strategy based on matrix operation comprises: S41, starting Apache Spark, reading, by a master node, a sparse transaction dataset D, horizontally cutting D into P successive data blocks with a same size, and sending the P data blocks to P slave nodes respectively; S42, traversing, by each slave node, the corresponding data block, calculating support counts of all items, and sending the support counts of the items to the master node; S43, comparing, by the master node, the support counts of all the items with a minimum support threshold, screening out frequent items, generating F_List and H-Table, and sending F_List and H-Table to the P slave nodes; S44, traversing again, by each slave node, the corresponding data block according to F_List, converting D into PBM and storing PBM according to S33, calculating the number of rows where the first "1" is located at a same position, in PBM, forming, item numbers, corresponding to column numbers, in H-table and the number of rows, and sending the item numbers and the number of rows to the master node; S45: adding, by the master node, rows corresponding to a same item number, performing grouping according to the load balancing strategy based on, matrix operation to generate a group list which is denoted as G_List, and sending G_List to the P slave nodes; S46: exchanging data in PBM between the slave nodes according to G-list; S47, after data exchanging is completed, mining local frequent item sets by the slave nodes according to G-List and S34; and S48, sending, by the slave nodes, the local frequent item sets to the master node to be aggregated to obtain all frequent item sets (frequent item sets of the sparse transaction set D).

Further, the load balancing strategy based on matrix operation comprises: S451, sorting, by the master node, the item numbers and the number of rows, obtained after the rows are added, in a descending order; S452: converting, by the master node, the sorted item numbers and number of rows into frequent items sorted in the descending, order according to a one-to-one corresponding relationship between the frequent items in F_List and the item numbers in H-Table; S453, sequentially combining, by the master node, the frequent items from two ends to obtain P groups of frequent items; and S454: sequentially scanning, by the master node, the frequent items in the P groups to generate the group list G_List.

Further, discretizing the historical operating data through a fuzzy C-means algorithm comprises: alphanumerically marking data intervals obtained after discretization, and replacing a numerical value of each piece of data with a mark number of the interval where the piece of data is located.

An optimization system for turbines of a thermal power unit, comprises a first module configured to acquire historical operating data and perform data preprocessing, with an optimization objective of decreasing the heat rate of turbines; a second module configured to select, from the historical operating data, a set of controllable unit operating parameters, the correlation of which with the heat rate of the turbines conforms to a set condition, as optimized parameters through canonical correlation analysis-based rough screening, and Pearson correlation analysis-based fine screening; a third module configured to construct a sparse data-oriented-pattern-growth association rule mining algorithm; a fourth module configured to parallelly implement the global calculation-balanced pattern-growth association rule mining algorithm on a big data analysis and processing framework Apache Spark according to a load balancing strategy based on matrix operation; and a fifth module configured to discretize the historical operating data through a fuzzy C-means algorithm, mine the discretized historical operating data based on the parallelly implemented pattern-growth association rule mining algorithm to obtain an association rule, and perform de-discretization to obtain target values of optimized parameters of the turbines under boundary conditions.

Compared with the prior art, the invention has the following beneficial effects: by employing binary matrixes and the hyperlink technique, the invention designs a new pattern-growth association rule mining algorithm, which can effectively overcome the defects of high time consumption and memory usage of the Apriori algorithm and the FP-Growth algorithm when the Apriori algorithm and the FP-Growth algorithm are used for mining a frequent patter of sparse data; moreover, in view of the features of mass operating data of turbines of a thermal power unit under a full working condition and a long cycle, the invention designs an association rule mining algorithm which can be parallelly implemented on a big data analysis and processing framework ApacheSpark primarily based on memory computing, such that the disadvantage of frequent disk reading and writing of MapReduce is overcome, and I/O expenditure is greatly reduced; in addition, considering that a binary matrix data storage structure is beneficial to matrix calculation, the invention proposes a load balancing strategy based on matrix operation, which can accurately allocate tasks of cluster computing nodes, performance advantages of clusters are brought into full play, and mass operating data of turbines can be efficiently mined to obtain target values of optimized operating parameters of the turbines in case of a low heat rate.

DETAILED DESCRIPTION

The invention will be further described below in conjunction with the accompanying drawings. The following embodiments are merely used for describing the technical solutions of the invention more clearly, and should not be construed as limitations of the protection scope of the invention.

Embodiment 1

Figure 1:
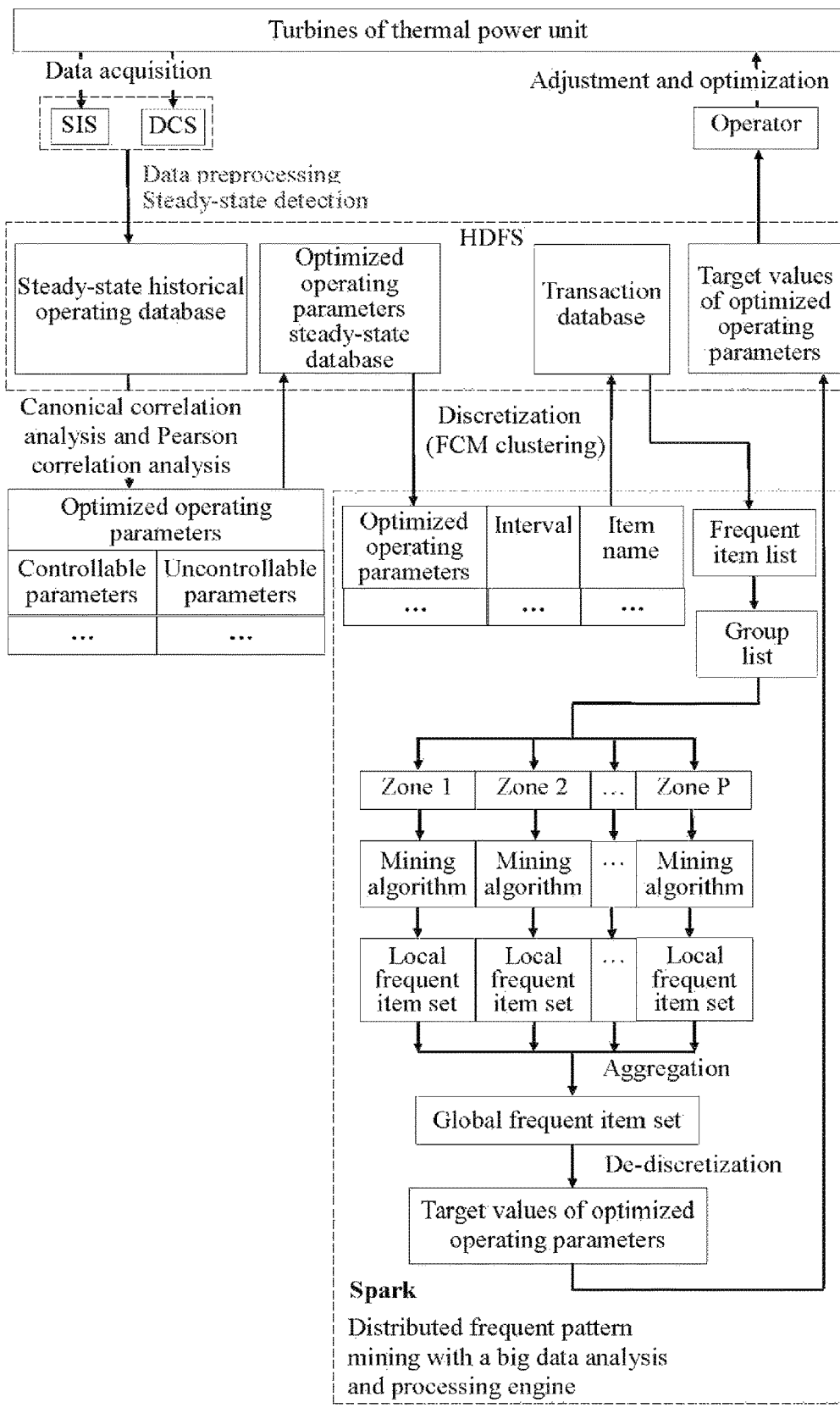
FIG. 1 is a principal flow diagram of an optimization method for turbines of a thermal power unit according to one embodiment of the invention.
Figure 2:
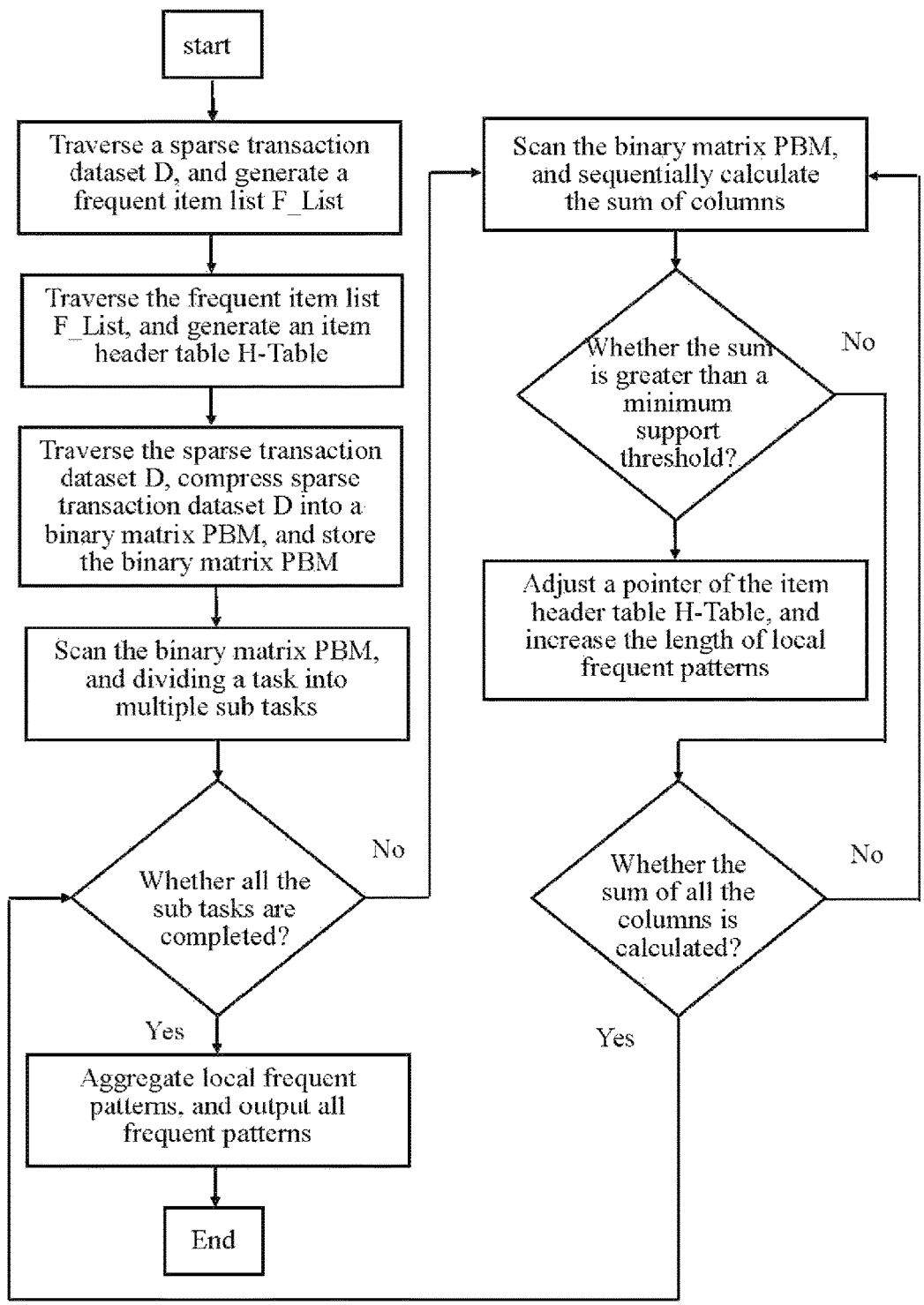
FIG. 2 is a flow diagram of an association rule mining algorithm according to one embodiment of the invention.
Figure 3:
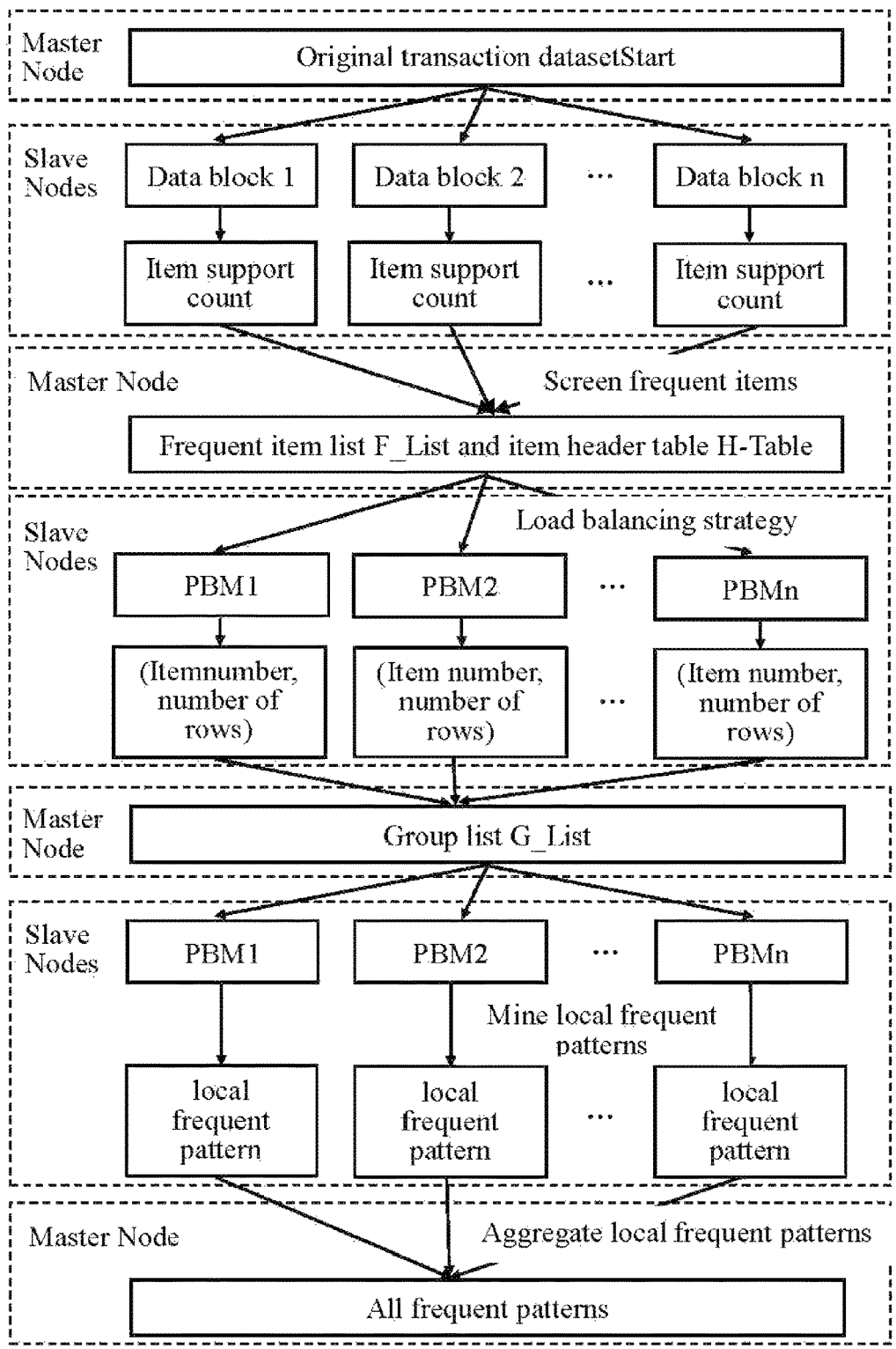
FIG. 3 is a flow diagram of parallel implementation of the association rule mining algorithm on Apache Spark according to one embodiment of the invention.

As shown in FIG. 1-FIG. 3, an optimization method for turbines of a thermal power unit comprises: acquiring historical operating data and performing data preprocessing, with an optimization objective of decreasing the heat rate of turbines; selecting, from the historical operating data, a set of controllable unit operating parameters, the correlation of which with the heat rate of the turbines conforms to a set condition, as optimized parameters through canonical correlation analysis-based rough screening and Pearson correlation analysis-based fine screening; constructing a sparse data-oriented pattern-growth association rule mining algorithm; parallelly implementing the global calculation-balanced pattern-growth association rule mining algorithm on a big data analysis and processing framework Apache Spark according to a load balancing strategy based on matrix operation; and discretizing the historical operating data through a fuzzy C-means algorithm, mining the discretized historical operating, data based on the parallelly implemented pattern-growth association rule mining algorithm to obtain an association rule, and performing de-discretization to obtain target values of optimized parameters of the turbines under boundary conditions.

Step 1: with an optimization objective of decreasing the heat rate of turbines, historical operating data is acquired, and data preprocessing is performed, wherein the data preprocessing comprises eliminating abnormal data and redundant data in the historical operating data and performing steady-state detection; and a criterion of the steady-state detection is that, in a period of time, a unit may be considered as being in a steady operating condition when fluctuations of operating state parameters of the turbines are within set ranges.

First, the heat rate of a turbine unit, as one of the heat economy indicators, comprehensively reflects the heat economy of the unit, so the heat rate is selected as the performance indicator, and the operating optimization objective is to decrease the heat rate of turbines; next, in this embodiment, historical data, within a complete operation cycle between two halts for maintenance, of turbines of a 1000 MW thermal power unit from August 2018 to July 2019 is acquired from an SIS and a DCS of a power plant, the sampling frequency is 60 s, and 525,600 pieces of historical operating data are acquired in total, excluding a few missing values; then, obvious abnormal dead data and defective data are directly eliminated; for multiple pieces of normal data of one parameter measured at multiple measurement points, a mean value of the multiple pieces of normal data is calculated to obtain a-piece of data capable of comprehensively and correctly reflecting the actual state; and finally, the unit load and main steam pressure are selected as parameters for steady-state detection, and the criterion of the steady-state detection is that the difference between a maximum value and a minimum value of data in 20 minutes is within a stable threshold range.

Step 2: in view of the features of high dimensionality and strong correlation of the operating data parameters of the turbines, a set of controllable unit operating parameters highly correlated with the heat rate of the turbines is selected from the historical operating data through canonical correlation analysis-based rough screening and Pearson correlation analysis-based fine screening.

First, a significance test is performed on canonical correlation coefficients of controlled variables of the turbines, and if the correlation of one pair of controlled variables is not significant, it indicates that this pair of variables is not representative, and this pair of variables is rejected; next, several pairs of variables with significant correlations and high canonical correlation coefficients are selected, and variables, the absolute value of a linear combination coefficient of which is large, are selected as candidate optimized operating parameters; then, the number of the candidate optimized operating parameters is further reduced through Pearson correlation analysis by reserving only the candidate optimized operating parameters with the Pearson correlation coefficient greater than 0.8; and finally, the optimized operating parameters of the turbines are unit power, main steam flow, main steam pressure and temperature, outlet water pressure of a feed water pump, feed water temperature, and vacuum degree of a condenser.

Step 3: in view of the features of large difference in transaction pattern and scattered item distribution of sparse data mined in a frequent pattern, a sparse data-oriented pattern-growth association rule mining algorithm is constructed, which comprises:

S31: a minimum support threshold is set, and a sparse transaction dataset is traversed and denoted as D, frequencies of items are recorded, and a frequent item list is generated and denoted as F_List;

S32: F_List is traversed, frequent items are marked with numbers, and an item header table is generated and denoted as H-Table, wherein the item header table comprises item numbers, support counts and a link pointer;

S33: non-frequent items in D are screened out, D is converted into a binary matrix and denoted as PBM, and the binary matrix is stored, wherein an element marked by "1" indicates that a frequent item, corresponding to the element, in F-List is included, in a transaction, and an element marked by "0" indicates that a frequent item, corresponding to the element, in the F-List is not included in a transaction;

S34: PBM is scanned, the pointer in H-Table is adjusted, the position of a first "1" in each row of PBM is linked with the corresponding frequent item in H-Table, rows where the first "1" is located at a same position are extracted from PBM to generate multiple sub PBMs, and a task of mining all frequent item sets into multiple sub tasks of mining local frequent, item sets; wherein, each sub task comprises the following steps:

S341: PBM is scanned, the sum of each, column is calculated, and support counts of frequent items in a sub H-table corresponding to the sub PBM are updated;

S342: columns, the sum of which is greater than the minimum support threshold, in the sub PBM are linked with the corresponding frequent items in the sub H-table to form longer local frequent item sets; and S343: S41 and S342 are performed recursively until the sum of each column in the sub PBM is less than the minimum support threshold; and S35: all the local frequent item sets are aggregated, and all the frequent item sets are output.

Step 4: to solve the problem that a serial association rule mining algorithm cannot mine mass data due to the limitation of hardware resources of a computer, a load balancing strategy based on matrix operation is proposed on a big data analysis and processing framework Apache Spark, and the global calculation-balanced pattern-growth association rule mining algorithm is implemented parallelly, which comprises:

S41: Apache Spark is started, the sparse transaction dataset D is read by a master node, D is horizontally cut into P successive data blocks with a same size, and the P data blocks are sent to P slave nodes respectively;

S42: each slave node traverses the corresponding data block, and support counts of all items are calculated and sent to the master node;

S43: the master node compares the support counts of all the items with the minimum support threshold, frequent items are screened out, and F_List and H-Table are generated and sent to the P slave nodes;

S44: each slave node traverses again the corresponding data block according to F_List, D is converted into PBM and PBM is stored according to S33, the number of rows, where the first "1" is located at a same position, in PBM is calculated, and key value pairs (item numbers, corresponding to column numbers, in H-Table and the number of rows) are formed and sent to the master node;

S45: the master node adds rows corresponding to a same item number, grouping is performed according to the new load balancing strategy to generate a group list which is denoted as G_List and G_List is sent to the P slave nodes, which comprises:

S451: the key value pairs (the item numbers and the number of rows) obtained after the rows are added are sorted by the master node in a descending order;

S452: the master node converts the sorted key value pairs (the item numbers and the number of rows) into frequent items sorted in the descending order according to a one-to-one corresponding relationship between the frequent items in F_List and the item numbers in H-Table;

S453: the master node sequentially combines the frequent items from two ends to obtain P groups of frequent items; and S454: the master node sequentially scans the frequent items in the P groups to generate the group list G_List;

S46: data, in PBM is exchanged between the slave nodes according to G-list;

S47: after data exchanging is completed, local frequent item sets are mined by the slave nodes according to G-List and S34 and S48: the local frequent item sets are sent, by the slave nodes, to the master node to be aggregated to obtain all frequent item sets (frequent item sets of the sparse transaction set D).

Step 5: the historical operating data is discretized through a fuzzy C-means algorithm, a frequent pattern of the discretized historical operating data is mined based on the parallelly implemented pattern-growth association rule mining algorithm, and de-discretization is performed to obtain target values of the optimized parameters of the turbines under boundary conditions, wherein, the fuzzy C-means (FCM) algorithm can effectively classify objects with complex characteristics and provide a relatively optimal classification result, which better accords with the objective reality. Thus, the FCM algorithm is used for discretizing steady-state historical data of the optimized operating parameters, data intervals obtained after discretization is marked with alphabets and numbers, and the numerical value of each piece of data with the mark number of the interval where the piece of data is located.

By calculation, under a fixed boundary condition, a strong association rule obtained in case of typical loads is shown in Table 1:

TABLE 1

Strong association rule

| Operating parameter and performance indicator | 500 MW | 600 MW | 700 MW | 800 MW | 900 MW | 1000 MW |
|---|---|---|---|---|---|---|
| Unit power/MW | [494.8, 500.5] | [602.5, 623.1] | [703.1, 715.6] | [798.2, 802.1] | [892.4, 899.5] | [980.0, 933.5] |
| Main steam flow/(t/h) | [1070.4, 1271.5] | [1225.6, 1514.8] | [1780.5, 1805.8] | [1715.6, 2052.3] | [2115.2, 2331.5] | [2432.8, 2552.5] |
| Main steam pressure/MPa | [13.54, 13.84] | [17.35, 18.57] | [19.56, 19.80] | [21.49, 21.76] | [23.76, 24.05] | [24.41, 25.34] |
| Main steam temperature/° C. | [593.6, 596.4] | [593.8, 596.0] | [595.4, 597.9] | [594.6, 596.9] | [594.6, 595.8] | [593.8, 595.7] |
| Outlet water pressure of feed water pump | [17.12, 17.45] | [20.32, 22.34] | [22.98, 23.24] | [25.48, 26.12] | [28.68, 29.08] | [29.62, 30.68] |
| Feed water temperature/° C. | [248.7, 255.8] | [265.4, 272.9] | [275.5, 276.7] | [282.9, 283.7] | [289.6, 291.1] | [296.5, 297.4] |
| Vacuum degree of condenser (kPa) | [2.67, 3.58] | [3.48, 3.75] | [3.87, 3.96] | [3.86, 4.19] | [2.89, 3.67] | [5.3, 6.4] |
| Heat rate (kJ/kWh) | [7135.1, 7465.8] | [6902.3, 7266.8] | [6820.7, 7158.2] | [6802.5, 7116.1] | [6785.5, 7057.8] | [6690.3, 6816.8] |

TABLE 2

Target values of optimized operating parameters

| | Operating parameter and performance indicator | | | | | |
|---|---|---|---|---|---|---|
| | 500 MW | 600 MW | 700 MW | 800 MW | 900 MW | 1000 MW |
| Unit power/MW | 497.65 | 612.8 | 709.35 | 800.15 | 895.95 | 956.75 |
| Main steam flow/(t/h) | 1170.95 | 1370.2 | 1793.15 | 1883.95 | 2223.35 | 2492.65 |
| Main steam pressure/MPa | 13.69 | 17.96 | 19.68 | 21.63 | 23.91 | 24.88 |
| Main steam temperature/° C. | 595 | 594.9 | 596.65 | 595.75 | 595.2 | 594.75 |

TABLE 2-continued

Target values of optimized operating parameters

| | Operating parameter and performance indicator | | | | | |
|---|---|---|---|---|---|---|
| | 500 MW | 600 MW | 700 MW | 800 MW | 900 MW | 1000 MW |
| Outlet water pressure of feed water pump | 17.29 | 21.33 | 23.11 | 25.8 | 28.88 | 30.15 |
| Feed water temperature/° C. | 252.25 | 269.15 | 276.1 | 283.3 | 290.35 | 296.95 |
| Vacuum degree of condenser (kPa) | 3.13 | 3.62 | 3.92 | 4.03 | 3.28 | 5.85 |
| Heat rate (kJ/kWh) | 7300.45 | 7084.55 | 6989.45 | 6959.3 | 6921.65 | 6753.55 |

The operating parameters of the unit in case of different loads can be adjusted according to the target values in Table 2 to optimize the heat rate to make the unit operate in the optimal condition. For example, when the unit operates under a 1000 MW load, the optimized value of the heat rate is compared with the mean value of the heat rate in actual operation, the optimized value is 6753.55 kJ/kW·h according to the association rule, and the actual mean value of the heat rate in actual operation is 6780.35 kJ/kW·h, so the heat rate is, decreased by 26.8 kJ/kW·h. According to the calculation formula of the rate of standard coal consumption:

$$b_b = q \times 10^3 / (29308 \eta_{gd} \eta_g) \quad (1)$$

Where, $b_b$ is the rate of standard coal consumption, g/kW·h; $\eta_{gd}$ is the pipe efficiency, the value of which in the invention is 0.98; $\eta_g$ is the boiler efficiency, the value of which in the invention is 0.92, the difference between an optimized value and a mean value of the rate of standard coal consumption in actual operation is 1.01 g/kW·h, that is, when the unit operates under a load of about 1000 MW, 1.01 g of coal can be saved every 1 kW·h power through the, optimization method for turbines of a thermal power unit based on sparse big data, such that, economic spending is reduced, the emission of air pollutants is reduced, and the purpose of energy conservation and emission reduction can be fulfilled effectively.

The association rule mining algorithm is used for analyzing and processing discrete data, and a large pattern difference and scattered distribution of items will be inevitably caused after continuous operating data of turbines of a thermal power unit is discretized; in addition, the turbine is a multi-variable and high-dimension system, so the sparsity of data will become more obvious after high-dimensional data is discretized. In this embodiment, a new pattern-growth association rule mining algorithm is designed through by means of binary matrixes and the hyperlink technique to effectively overcome the defects of high time consumption and memory usage of the Apriori algorithm and the FP-Growth algorithm when the Apriori algorithm and the FP-Growth algorithm are used for mining a frequent patter of sparse data; moreover, in view of the features of mass operating data of turbines of a thermal power unit under a full working condition and a long cycle, the invention designs an association rule mining algorithm which can be parallelly implemented on a big data analysis and processing framework ApacheSpark primarily based on memory computing, such that the disadvantage of frequent disk reading and writing of MapReduce is overcome, and I/O expenditure is greatly reduced; in addition, considering that a binary matrix data storage structure is beneficial to matrix calculation, the invention proposes a load balancing strategy based on matrix operation, which can accurately allocate tasks of cluster computing nodes, performance advantages of clusters are brought into full play, and mass operating data of turbines can be efficiently mined to obtain target values of optimized operating parameters of the turbines in case of a low heat rate.

Embodiment 2

Based on the optimization method for turbines of a thermal power unit in Embodiment 1 this embodiment provides an optimization system for turbines of a thermal power unit, comprising: a first module configured to acquire historical operating data, and perform data preprocessing, with an optimization objective of decreasing the heat rate of turbines; a second module configured to select, from the historical operating data, a set of controllable unit operating parameters, the correlation of which with the heat rate of the turbines conforms to a set condition, as optimized parameters through canonical correlation analysis-based rough screening and Pearson correlation analysis-based fine screening; a third module configured to construct a sparse data-oriented pattern-growth association rule mining algorithm; a fourth module configured to parallelly implement the global calculation-balanced pattern-growth association rule mining algorithm on a big data analysis and processing framework Apache Spark according to a load balancing strategy based on matrix operation; and a fifth module configured to discretize the historical operating data through a fuzzy C-means algorithm, mine the discretized historical operating data based on the parallelly implemented pattern-growth association rule mining algorithm to obtain an association rule, and perform de-discretization to obtain target values of optimized parameters of the turbines under boundary conditions.

The above embodiments are merely preferred ones of the invention. It should be pointed out that those ordinarily skilled in the art can make various improvements and transformations without deviating from the technical principle of the invention, and all these improvements and transformations should fall within the protection scope of the invention.

What is claimed is:

1. An optimization method for turbines of a thermal power unit, comprising the steps of:
acquiring, by a computer, historical operating data and performing data preprocessing, with an optimization objective of decreasing a heat rate of turbines;
selecting, by the computer, from historical operating data, a set of controllable unit operating parameters, a correlation of which with the heat rate of the turbines conforms to a set condition, as optimized parameters through canonical correlation analysis-based rough screening and Pearson correlation analysis-based fine screening;
constructing, by the computer, a sparse data-oriented pattern-growth association rule mining algorithm;
parallelly implementing, by the computer, the global calculation-balanced pattern-growth association rule mining algorithm on a big data analysis and processing framework Apache Spark according to a load balancing strategy based on matrix operation;
wherein parallelly implementing the global calculation-balanced pattern-growth association rule mining algorithm on a big data analysis and processing framework Apache Spark according to a load balancing strategy based on matrix operation comprises:
S41, starting Apache Spark, reading, by a master node, a sparse transaction dataset D, horizontally cutting D into P successive data blocks with a same size, and sending the P data blocks to P slave nodes respectively;
S42, traversing, by each slave node, the corresponding data block, calculating support counts of all items, and sending the support counts of the items to the master node;
S43, comparing, by the master node, the support counts of all the items with a minimum support threshold, screening out frequent items, generating F_List and H-Table, and sending F_List and H-Table to the P slave nodes;
S44, traversing again, by each slave node, the corresponding data block according to F_List, converting D into PBM and storing PBM, calculating the number of rows where the first "1" is located at a same position in PBM, forming item numbers, corresponding to column numbers, in H-table and the number of rows, and sending the item numbers and the number of rows to the master node;
S45: adding, by the master node, rows corresponding to a same item number, performing grouping according to the load balancing strategy based on matrix operation to generate a group list which is denoted as G_List, and sending G_List to the P slave nodes;
S451, sorting, by the master node, the item numbers and the number of rows, obtained after the rows are added, in a descending order;
S452: converting, by the master node, the sorted item numbers and the number of, rows into frequent items sorted in the descending order according to a one-to-one corresponding relationship between the frequent items in F_List and the item numbers in H-Table;
S453, sequentially combining, by the master node, the frequent items from two ends to obtain P groups of frequent items; and
S454: sequentially scanning, by the master node, the frequent items in the P groups to generate the group list G_List;
S46: exchanging data in PBM between the slave nodes according to G-list;
S47, after data exchanging is completed, mining local frequent item sets by the slave nodes according to G-List; and
S48, sending, by the slave nodes, the local frequent item sets to the master node to be aggregated to obtain all frequent item sets (frequent item sets of the sparse transaction set D); and
discretizing, by the computer, the historical operating data through a fuzzy C-means algorithm, mining the discretized historical operating data based on the parallelly implemented pattern-growth association rule mining algorithm to obtain an association, rule, and performing de-discretization to obtain target values of the optimized parameters of the turbines under boundary conditions.

2. The optimization method for turbines of a thermal power unit according to claim 1, wherein constructing a sparse data-oriented pattern-growth association rule mining algorithm comprises:
S31: setting a minimum support threshold, and traversing a sparse transaction dataset which is denoted as D, recording frequencies of items, and generating a frequent item list which is denoted as F_List;
S32, traversing F_List, marking frequent items with numbers, generating an item header table, which is denoted as H-Table and comprises item numbers, support counts and a link pointer;
S33, screening out non-frequent items in D, converting D into a binary matrix which is denoted as PBM, and storing the binary matrix, wherein an element marked by "1" indicates that a frequent item, corresponding to the element, in F-List is included in a transaction, and an element marked by "0" indicates that a frequent item, corresponding to the element, in the F-List is not included in a transaction,
S34, scanning PBM, adjusting the pointer in H-Table, linking the position of a first "1" in each row of PBM with the corresponding frequent item in H-Table, extracting rows where the first "1" is located at a same position from PBM to generate multiple sub PBMs, and converting a task of mining, all frequent item sets into multiple sub tasks of mining local frequent item sets; and
S35: aggregating all the local frequent item sets, and outputting all the frequent item sets.

3. The optimization method for turbines of a thermal power unit according to claim 2, wherein the sub task comprises the following steps:
S341: scanning PBM, calculating the sum of each column, and updating support counts of frequent items in a sub H-table corresponding to the sub PBM;
S342, linking, by means of the pointer, columns, the sum of which is greater than the minimum support threshold, in the sub PBM with the corresponding frequent items in the sub H-table to form longer local frequent item sets; and
S343, recursively performing S341 and 5342 until the sum of each column in the sub PBM is less than the minimum support threshold.

4. The optimization method for turbines of a thermal power unit according to claim 1, wherein the data preprocessing comprises eliminating abnormal data and redundant data in the historical operating data, and performing steady-state detection on the historical operating data.

5. The optimization method for turbines of a thermal power unit according to claim 1, wherein a criterion of the steady-state detection is that, in a period of time, a unit is considered as being in a steady operating condition when fluctuations of operating state parameters of the turbines are within set ranges.

6. The optimization method for turbines of a thermal power unit according to claim 1, wherein discretizing the historical operating data through a fuzzy C-means algorithm comprises: alphanumerically marking data intervals obtained after discretization, and replacing a numerical value of each piece of data with a mark number of the interval where the piece of data is located.

7. An optimization system for turbines of a thermal power unit, comprising:
   a computer, wherein the computer comprises:
   a first module configured to acquire historical operating data and perform, data preprocessing, with an optimization objective of decreasing a heat rate of turbines;
   a second module configured to select, from the historical operating data, a set of controllable unit operating parameters, a correlation of which with the heat rate of the turbines conforms to a set condition, as optimized parameters through canonical correlation analysis-based rough screening and Pearson correlation analysis-based fine screening;
   a third module configured to construct a sparse data-oriented pattern-growth association rule mining algorithm;
   a fourth module configured to parallelly implement the global calculation-balanced pattern-growth association rule mining algorithm on a big data analysis and processing framework Apache Spark according to a load balancing strategy based on matrix operation;
   wherein parallelly implementing the global calculation-balanced pattern-growth association rule mining algorithm on a big data analysis and processing framework Apache Spark according to a load balancing strategy based on matrix operation comprises:
      S41, starting Apache Spark, reading, by a master node, a sparse transaction dataset D, horizontally cutting D into P successive data blocks with a same size, and sending the P data blocks to P slave nodes respectively;
      S42, traversing, by each slave node, the corresponding data block, calculating support counts of all items, and sending the support counts of the items to the master node;
      S43, comparing, by the master node, the support counts of all the items with a minimum support threshold, screening out frequent items, generating F_List and H-Table, and sending F_List and H-Table to the P slave nodes;
      S44, traversing again, by each slave node, the corresponding data block according to F_List, converting D into PBM and storing PBM, calculating the number of rows where the first "1" is located at a same position in PBM, forming item numbers, corresponding to column numbers, in H-table and the number of rows, and sending the item numbers and the number of rows to the master node;
      S45: adding, by the master node, rows corresponding to a same item number, performing grouping according to the load balancing strategy based on matrix operation to generate a group list which is denoted as G_List, and sending G_List to the P slave nodes;
         S451, sorting, by the master node, the item numbers and the number of rows, obtained after the rows are added, in a descending order;
         S452: converting, by the master node, the sorted item numbers and the number of, rows into frequent items sorted in the descending order according to a one-to-one corresponding relationship between the frequent items in F_List and the item numbers in H-Table;
         S453, sequentially combining, by the master node, the frequent items from two ends to obtain P groups of frequent items; and
         S454: sequentially scanning, by the master node, the frequent items in the P groups to generate the group list G_List;
      S46: exchanging data in PBM between the slave nodes according to G-list;
      S47, after data exchanging is completed, mining local frequent item sets by the slave nodes according to G-List; and
      S48, sending, by the slave nodes, the local frequent item sets to the master node to be aggregated to obtain all frequent item sets (frequent item sets of the sparse transaction set D); and
   a fifth module configured to discretize the historical operating data through a fuzzy C-means algorithm, mine the discretized historical operating data based on the parallelly implemented pattern-growth association rule mining algorithm to obtain an association rule, and perform de-discretization to obtain target values of the optimized parameters of the turbines under boundary conditions.

* * * * *